(12) United States Patent
Kayano

(10) Patent No.: US 10,942,437 B2
(45) Date of Patent: Mar. 9, 2021

(54) ROTATABLE PROJECTION LENS AND PROJECTOR

(71) Applicant: FUJIFILM Corporation, Tokyo (JP)

(72) Inventor: Hironobu Kayano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/361,965

(22) Filed: Mar. 22, 2019

(65) Prior Publication Data

US 2019/0219915 A1    Jul. 18, 2019

Related U.S. Application Data

(63) Continuation of application No. PCT/JP2017/029921, filed on Aug. 22, 2017.

(30) Foreign Application Priority Data

Sep. 23, 2016  (JP) .............................. JP2016-186150

(51) Int. Cl.
*G03B 21/28* (2006.01)
*G03B 21/14* (2006.01)
(Continued)

(52) U.S. Cl.
CPC .............. *G03B 21/28* (2013.01); *G02B 7/023* (2013.01); *G03B 21/14* (2013.01); *G03B 21/142* (2013.01);
(Continued)

(58) Field of Classification Search
CPC ...... G02B 13/16; G02B 17/023; G02B 17/08; G02B 23/08; G02B 7/14; G02B 7/24;
(Continued)

(56) References Cited

U.S. PATENT DOCUMENTS

| 4,048,653 A | 9/1977 | Spooner |
| 5,327,188 A * | 7/1994 | Kohmoto ............... G03B 17/14 |
| | | 359/825 |

(Continued)

FOREIGN PATENT DOCUMENTS

| CN | 101676793 A | 3/2010 |
| JP | 51-66036 A | 6/1976 |

(Continued)

OTHER PUBLICATIONS

Japanese Office Action, dated Jul. 23, 2019, for corresponding Japanese Application No. 2018-540920, with an English machine translation.

(Continued)

*Primary Examiner* — Bao-Luan Q Le
(74) *Attorney, Agent, or Firm* — Birch, Stewart, Kolasch & Birch, LLP

(57) ABSTRACT

A projection lens is separated by a second mirror into a first optical system that is disposed so as to be closer to an image forming panel and a second optical system that includes the second mirror and is disposed so as to be closer to a screen which is a projection surface. The second optical system is held rotatably around a second optical axis with respect to the first optical system by a first rotation mechanism. A rotation angle of the second optical system with respect to the first optical system is detected by a first sensor. A tilt angle of the projected image on the projection surface by the rotation angle is obtained by a tilt correction section, and the display position of the image to be displayed on the image forming panel is corrected according to the tilt angle.

17 Claims, 14 Drawing Sheets

(51) Int. Cl.
*G02B 7/02* (2021.01)
*H04N 9/31* (2006.01)
*G03B 21/20* (2006.01)
*G02B 27/09* (2006.01)
*G02B 7/14* (2021.01)

(52) U.S. Cl.
CPC ......... *H04N 9/3179* (2013.01); *H04N 9/3194* (2013.01); *G02B 7/021* (2013.01); *G02B 7/14* (2013.01); *G02B 27/0955* (2013.01); *G03B 21/2066* (2013.01)

(58) Field of Classification Search
CPC ........ G03B 21/00; G03B 21/14; G03B 21/28; G03B 21/145; H04N 5/74
See application file for complete search history.

(56) References Cited

U.S. PATENT DOCUMENTS

| | | | | |
|---|---|---|---|---|
| 5,469,236 A * | 11/1995 | Roessel | .................. | G02B 23/08 352/94 |
| 6,811,265 B2 * | 11/2004 | Soper | ..................... | G03B 21/30 353/99 |
| 7,090,354 B2 * | 8/2006 | Engle | ..................... | G02B 13/06 348/836 |
| 7,097,310 B2 * | 8/2006 | Perkins | .................. | G03B 21/28 248/343 |
| 7,431,465 B2 * | 10/2008 | Ozaki | .................... | G02B 17/02 348/E5.143 |
| 7,551,377 B2 * | 6/2009 | Kuroki | .................... | G02B 7/14 359/645 |
| 7,718,947 B2 * | 5/2010 | Yamamoto | ............. | G03B 17/17 250/208.1 |
| 7,905,609 B2 * | 3/2011 | Igarashi | ............... | G03B 21/145 347/239 |
| 7,936,504 B2 * | 5/2011 | Goodman | ............. | G02B 23/08 359/402 |
| 7,993,011 B2 * | 8/2011 | Ikeda | ..................... | G03B 21/28 353/69 |
| 8,093,542 B2 * | 1/2012 | Lin | ......................... | G03B 21/28 250/208.1 |
| 8,891,026 B2 * | 11/2014 | Ono | ...................... | G03B 21/142 348/747 |
| 10,216,071 B2 * | 2/2019 | Sugawara | ............ | G03B 21/142 |
| 2003/0128304 A1 * | 7/2003 | Park | .......................... | G02B 7/04 348/781 |
| 2003/0160947 A1 * | 8/2003 | Soper | ..................... | G03B 21/28 353/31 |
| 2004/0021959 A1 * | 2/2004 | Jang | ....................... | G02B 13/16 359/811 |
| 2004/0233394 A1 * | 11/2004 | Gohman | ............... | G02B 13/06 353/70 |
| 2004/0257539 A1 * | 12/2004 | Peterson | ................ | G03B 21/14 353/69 |
| 2005/0265708 A1 * | 12/2005 | Toya | ...................... | G03B 15/05 396/199 |
| 2006/0002109 A1 * | 1/2006 | Imade | .................... | H04N 9/3155 362/231 |
| 2006/0072080 A1 * | 4/2006 | Perkins | .................. | G03B 21/28 353/119 |
| 2007/0058141 A1 * | 3/2007 | Ozaki | .................... | G03B 21/28 353/98 |
| 2007/0081131 A1 * | 4/2007 | Van Der Palen | ...... | G03B 21/10 353/101 |
| 2007/0133109 A1 * | 6/2007 | Kuroki | .................... | G02B 7/14 359/819 |
| 2007/0146652 A1 * | 6/2007 | Peterson | .............. | G03B 21/005 353/102 |
| 2007/0289097 A1 * | 12/2007 | Barnett | ................. | G06F 1/1616 16/342 |
| 2008/0266528 A1 * | 10/2008 | Ikeda | .................... | G03B 21/28 353/69 |
| 2009/0015800 A1 * | 1/2009 | Igarashi | ................ | G03B 29/00 353/85 |
| 2012/0218528 A1 * | 8/2012 | Kano | ..................... | G03B 21/142 353/101 |
| 2012/0293778 A1 * | 11/2012 | Furuichi | .............. | G03B 21/145 353/101 |
| 2014/0253818 A1 * | 9/2014 | Ono | ....................... | H04N 5/7416 348/744 |
| 2015/0042965 A1 * | 2/2015 | Peterson | ................ | G03B 21/28 353/69 |
| 2016/0070158 A1 * | 3/2016 | Peterson | .............. | G02B 17/008 353/70 |
| 2016/0212392 A1 * | 7/2016 | Zhang | ..................... | H04N 9/31 |
| 2016/0246037 A1 * | 8/2016 | Amano | ................ | G02B 17/008 |
| 2016/0313631 A1 * | 10/2016 | Sugawara | ............ | G03B 21/28 |
| 2016/0341943 A1 * | 11/2016 | Peterson | .............. | G02B 13/04 |
| 2016/0342075 A1 * | 11/2016 | Peterson | ............... | H04N 9/317 |
| 2018/0321475 A1 * | 11/2018 | Amano | ............... | G02B 17/008 |
| 2018/0321476 A1 * | 11/2018 | Amano | ............... | G02B 17/008 |
| 2019/0011683 A1 * | 1/2019 | Amano | ............... | G02B 17/008 |
| 2019/0113726 A1 * | 4/2019 | Peterson | ............... | H04N 9/317 |
| 2019/0219915 A1 | 7/2019 | Kayano | | |

FOREIGN PATENT DOCUMENTS

| | | | |
|---|---|---|---|
| JP | 2007-515681 A | | 6/2007 |
| JP | 2007-525700 A | | 9/2007 |
| JP | 2007-264554 A | | 10/2007 |
| JP | 2012-98506 A | | 5/2012 |
| JP | 2012098506 A | * | 5/2012 |
| JP | 2013-235215 A | | 11/2013 |
| JP | 2016/104331 A1 | | 6/2016 |
| JP | 2016-136196 A | | 7/2016 |
| JP | 2016-156986 A | | 9/2016 |
| JP | 2016-166769 A | | 9/2016 |
| WO | WO 2018/055964 A1 | | 3/2018 |

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2017/029921, dated Apr. 4, 2019, with English translation.
International Search Report (Form PCT/ISA/210) for International Application No. PCT/JP2017/029921, dated Nov. 7, 2017, with English translation.
Chinese Office Action and Search Report, dated Jul. 24, 2020, for corresponding Chinese Application No. 201780042157.2, with an English translation of the Chinese Office Action.
Japanese Office Action, dated Oct. 27, 2020, for corresponding Japanese Application No. 2019-226596, with an English translation.

* cited by examiner

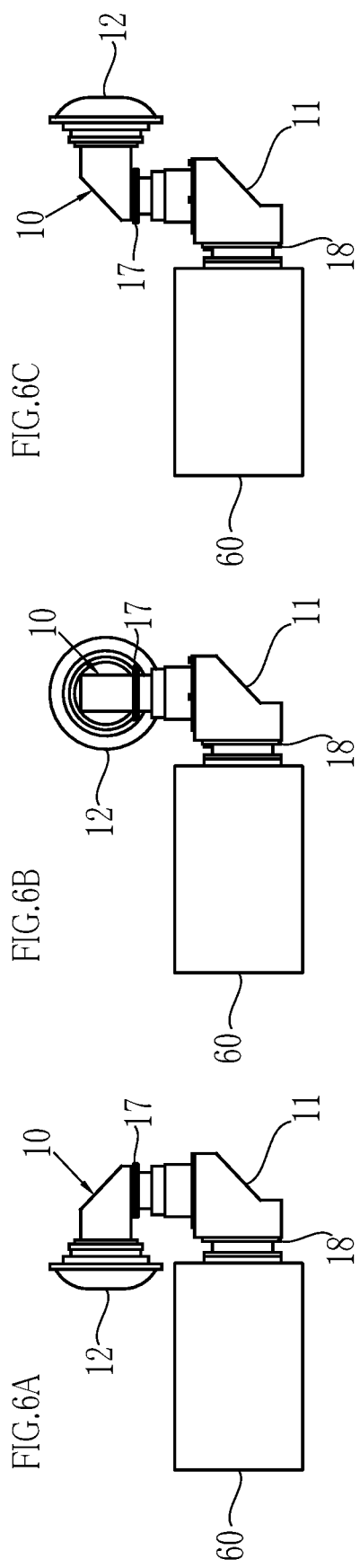
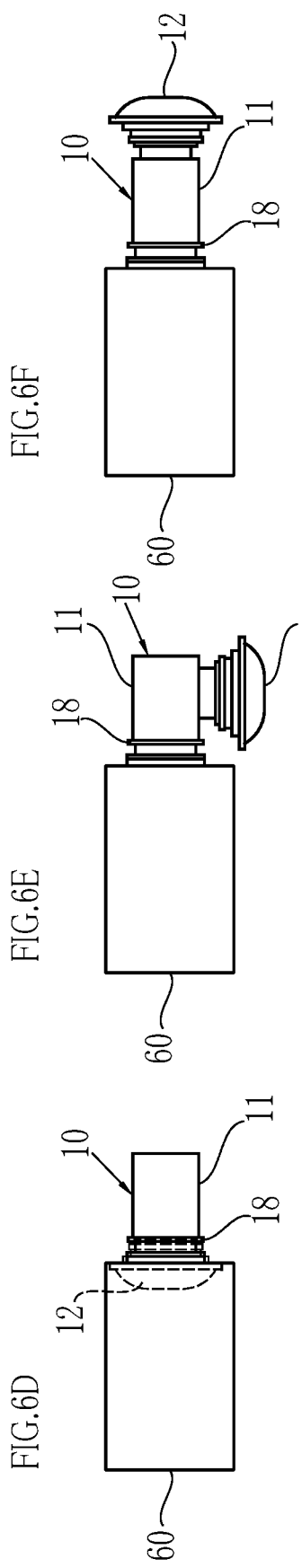
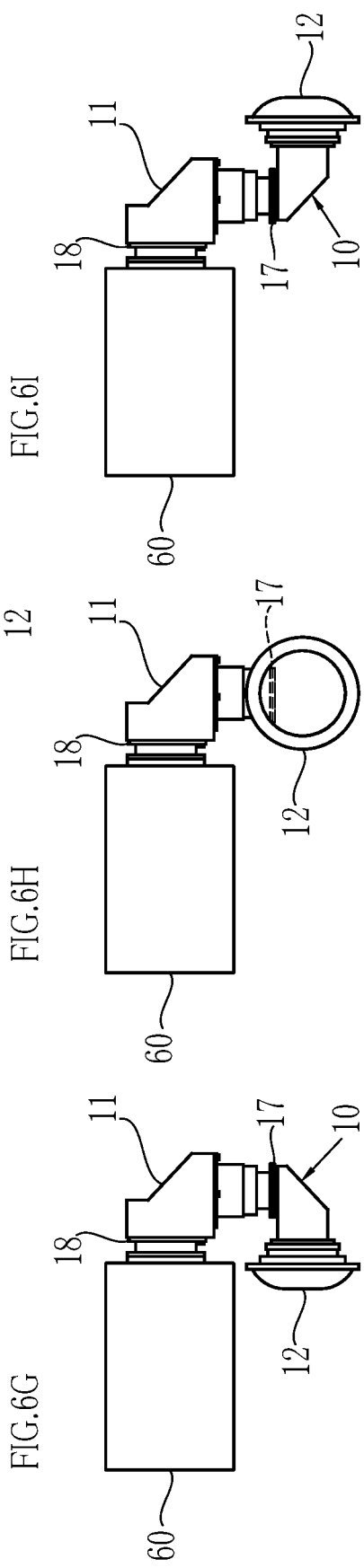
FIG.6A FIG.6B FIG.6C FIG.6D FIG.6E FIG.6F FIG.6G FIG.6H FIG.6I

ROTATABLE PROJECTION LENS AND PROJECTOR

CROSS-REFERENCE TO RELATED APPLICATIONS

This application is a Continuation of PCT International Application No. PCT/JP2017/029921 filed on 22 Aug. 2017, which claims priority under 35 U.S.C. § 119(a) to Japanese Patent Application No. 2016-186150 filed on 23 Sep. 2016. The above application is hereby expressly incorporated by reference, in its entirety, into the present application.

BACKGROUND OF THE INVENTION

1. Field of the Invention

The present invention relates to a projection lens and a projector.

2. Description of the Related Art

As examples of projectors, there are an overhead projector and a liquid crystal projector. Such a projector is usually used by being installed at a position where an image can be projected toward a projection surface.

When using the projector, it is necessary to determine the installation position of the projector in relation to the projection surface where the image is to be projected. In order to adjust the display position of the image, the position of a projector main body is moved, or the projector main body is inclined. Accordingly, in the conventional projector, position setting and orientation adjustment are troublesome.

For this reason, JP2007-264554A proposes a projector having a reflecting mirror in a projection optical system, in which an inclination angle of a reflecting surface with respect to incident light is changeable. Accordingly, by changing the inclination angle of the reflecting surface of the reflecting mirror, a position of the projection surface to which an image is to be projected can be changed.

SUMMARY OF THE INVENTION

However, in JP2007-264554A, although the projection position can be changed using the reflection mirror, it only changes the inclination angle of the reflection mirror. Since the projection position can be changed only in the direction of changing the inclination angle of the reflecting mirror, and the projection position can not be changed in other directions, there is a problem that the projection direction can not be freely set. Consequently, it is necessary to adjust the position and direction of the projector after all.

The present invention has been made in view of the above circumstances, and an object thereof is to provide a projection lens and a projector which can freely set a projection direction without changing a position and a direction of a projector main body.

In order to achieve the above object, a projection lens of the present invention is attached to a casing of a projector, and projects an image on an image forming panel onto a projection surface. The projection lens includes a first mirror, a second mirror, a first optical system, a second optical system, a first rotation mechanism, a second rotation mechanism, a first sensor, and a barrel. The first mirror bends a first optical axis to a second optical axis. The second mirror bends the second optical axis to a third optical axis. The first optical system includes the first mirror and is disposed on the image forming panel side with respect to the second mirror in an optical path. The second optical system includes the second mirror and is disposed on the projection surface side with respect to the first optical system in the optical path. The first rotation mechanism holds the second optical system rotatably around the second optical axis with respect to the first optical system. The second rotation mechanism holds the first optical system rotatably with respect to the casing. The first sensor detects a rotation angle of the second optical system with respect to the first optical system by the first rotation mechanism. Through the barrel, light of the second optical axis passes. Further, the second rotation mechanism is rotatable on a plane formed by a first direction, which is a horizontal direction, and a second direction. The projection lens is capable of projecting an image onto a projection surface on the first direction side and a projection surface on a third direction side crossing the first direction and the second direction. The projection lens is capable of projecting an image onto a projection surface on the second direction side by the rotation of the second rotation mechanism that causes the barrel to follow the horizontal direction and the rotation of the first rotation mechanism.

It is preferable that the projection lens is movable between a first position in which the barrel extends to one side of the second direction and a second position in which the barrel extends to the other side of the second direction, upon rotation of the second rotation mechanism. It is preferable that the projection lens is movable between the first position and the second position without contacting the casing, upon rotation of the second rotation mechanism. It is preferable that a tip of the projection lens is located inside the casing from an end of the casing in a side view, in case that the projection lens is in the first position or in the second position.

It is preferable that the second direction is a vertical direction. It is preferable that the barrel has a first lens and a second lens closer to the first mirror than the first lens, and a diameter of the second lens is larger than a diameter of the first lens. It is preferable that a tilt correction section is provided for correcting a tilt of an image due to the rotation of the first rotation mechanism.

A projector of the present invention includes the above-identified projection lens, the image forming panel, and the casing. Furthermore, in case of the projector whose projection lens has the above-identified tilt correction section, a position correction section is further provided for correcting a projection position of an image by shifting an attachment position of the projection lens to the casing, upon rotation of the second rotation mechanism. It is preferable that these projectors have an operation switch provided in the casing for rotating the first rotation mechanism or the second rotation mechanism.

According to the present invention, it can be provided a projection lens and a projector which can freely set a projection direction without changing a position and a direction of a projector main body.

BRIEF DESCRIPTION OF THE DRAWINGS

FIG. 6A to 6I are side views showing examples of various projection positions obtained by rotating the first rotation mechanism and a second rotation mechanism, wherein FIG. 6A shows an upper rear projection position, FIG. 6B shows an upper right projection position, FIG. 6C shows an upper front projection position, FIG. 6D shows a middle rear projection position, FIG. 6E shows a middle bottom projection position, FIG. 6F shows a middle front projection position, FIG. 6G shows a lower rear projection position, FIG. 6H shows a lower left projection position, and FIG. 6I shows a lower front projection position.

DESCRIPTION OF THE PREFERRED EMBODIMENTS

First Embodiment

Figure 1:
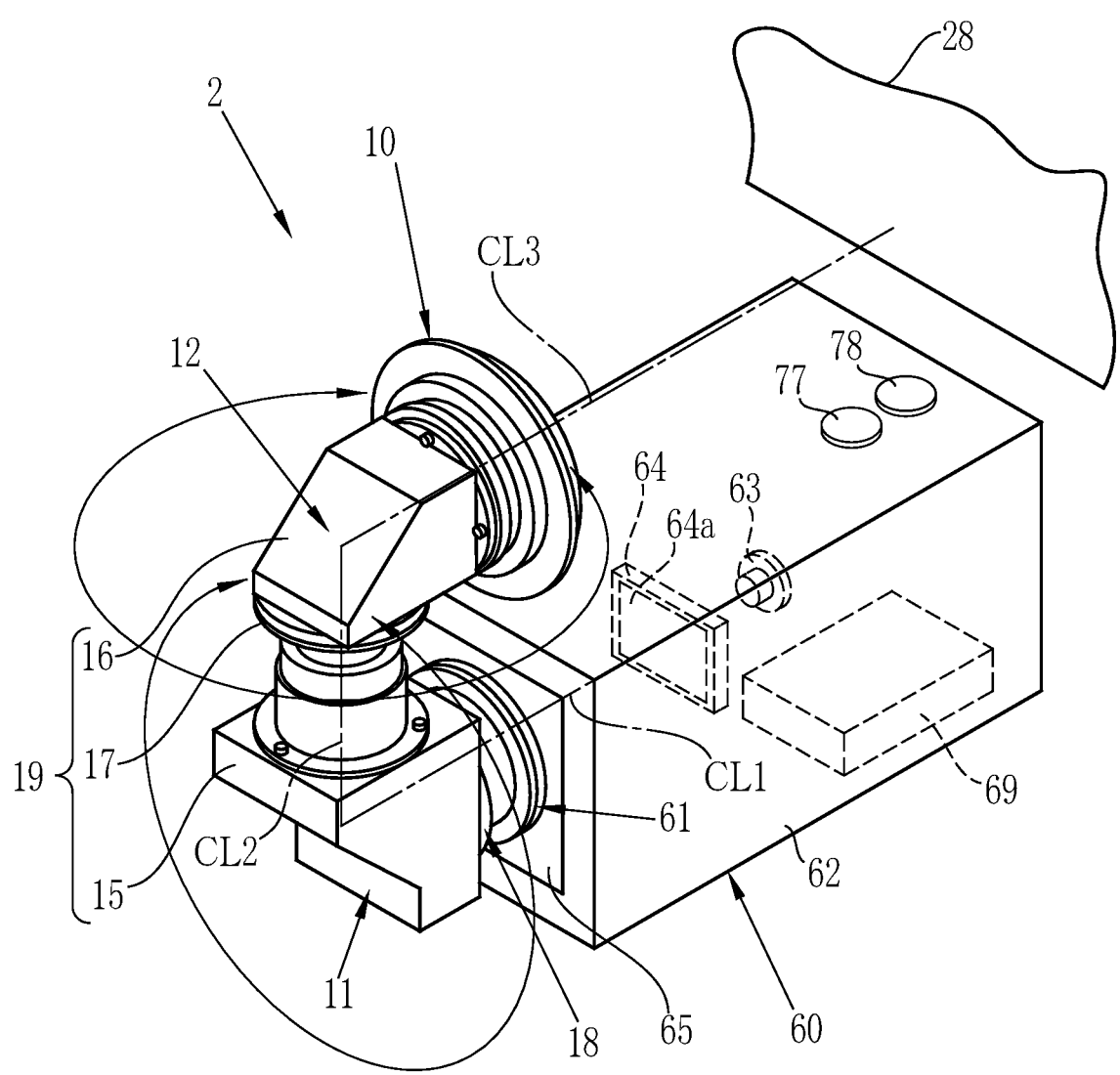
FIG. 1 is a perspective view showing a projector of the present invention.

As shown in FIG. 1, a projector 2 of the present embodiment comprises a projection lens 10 and a projector main body 60. FIG. 1 shows a case where the projector 2 is disposed on a horizontal plane such as a table.

Figure 2:
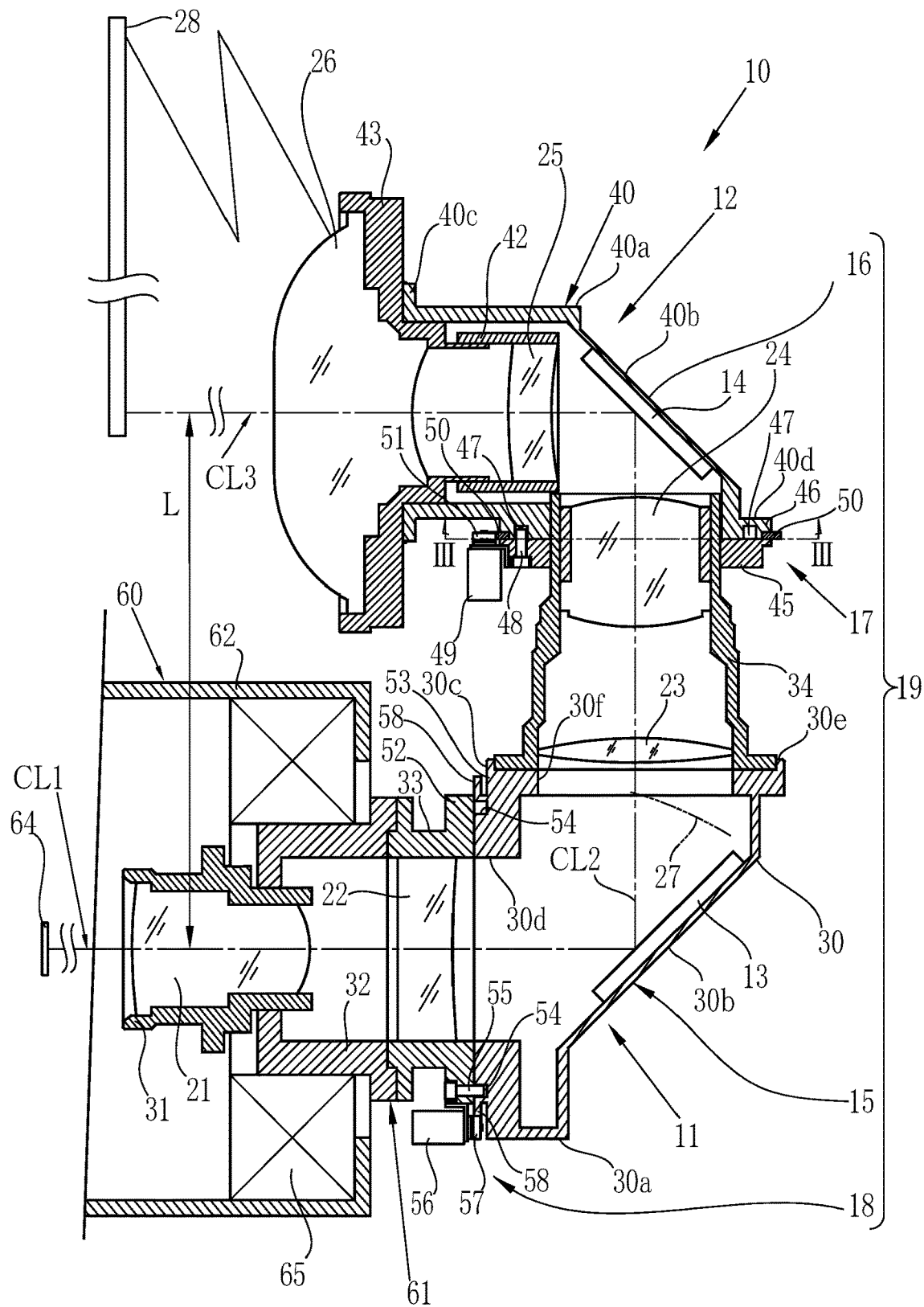
FIG. 2 is a longitudinal sectional view of the projector.

As shown in FIG. 2, the projection lens 10 comprises a first optical system 1I, a second optical system 12, a first mirror 13, a second mirror 14, a first holding member 15, a second holding member 16, a first rotation mechanism 17, and a second rotation mechanism 18. The first holding member 15, the second holding member 16, the first rotation mechanism 17, and the second rotation mechanism 18 constitute a lens barrel 19.

The first optical system 11 is constituted by a first lens 21, a second lens 22, a third lens 23, a fourth lens 24, and the first mirror 13. The first lens 21, the second lens 22, and the fourth lens 24 are displayed as a single lens for simplicity of illustration, but are constituted by a plurality of lens groups in reality. The first lens 21 and the second lens 22 forms an intermediate image on an imaging surface 27 by using illumination light from an image forming panel 64.

The first mirror 13 is disposed between the second lens 22 and the third lens 23. The first mirror 13 forms a second optical axis CL2 crossing a first optical axis CL1 at 90° by bending the first optical axis CL1 of the first lens 21 and the second lens 22 by reflection.

The first holding member 15 includes a first main body 30, a first lens frame 31, a first attachment barrel 32, a second attachment barrel 33, a third attachment barrel 34, and the second rotation mechanism 18. The first holding member 15 holds the first lens 21 to the fourth lens 24 and the first mirror 13. The first main body 30 is constituted by an approximately rectangular parallelepiped square tube. One corner portion of a lower plate 30a of the first main body 30 is obliquely cut, and thus, an inclined surface portion 30b is formed. The first mirror 13 is fixed onto an inner surface of the inclined surface portion 30b.

A first attachment hole 30d of the first optical system 11 is formed in a front plate 30c on an entrance side facing the inclined surface portion 30b. The second attachment barrel 33 is fixed to the first attachment hole 30d. A second attachment hole 30f is formed in an upper plate 30e of the first main body 30. A lower end portion of the third attachment barrel 34 is fixed to the second attachment hole 30f. The third attachment barrel 34 holds third lens 23 and the fourth lens 24 according to the second optical axis CL2.

The second optical system 12 is constituted by the second mirror 14, a fifth lens 25, and a sixth lens 26. The second mirror 14 is disposed between the fourth lens 24 and the fifth lens 25. The second mirror 14 forms a third optical axis CL3 crossing the second optical axis CL2 by 90° by bending the second optical axis CL2 by reflection. The fifth lens 25 and the sixth lens 26 are displayed as a single lens for simplicity in illustration, but are constituted by a plurality of lens groups in reality. The third lens 23 to the sixth lens 26 project the intermediate image formed on the imaging surface 27 by the first lens 21 and the second lens 22 onto, for example, a screen 28 which is a projection target.

The second holding member 16 includes a second main body 40, a second lens frame 42, a third lens frame 43, and the first rotation mechanism 17. The second holding member 16 integrally holds the fifth lens 25, the sixth lens 26, and the second mirror 14. The second main body 40 is constituted by an approximately rectangular parallelepiped square tube. One corner portion of an upper plate 40a of the second main body 40 is obliquely cut, and thus, an inclined surface portion 40b is formed. The second mirror 14 is fixed onto an inner surface of the inclined surface portion 40b.

An attachment flange 40c is formed on an end surface facing the inclined surface portion 40b of the second main body 40 in a horizontal direction. The third lens frame 43 is fixed to the attachment flange 40c. The second lens frame 42 is attached to one end of the third lens frame 43 so as to be movable in a direction of the third optical axis CL3. The fifth lens 25 is fixed to the second lens frame 42, and the sixth lens 26 is fixed to the third lens frame 43. The second lens frame 42 is moved along the third optical axis CL3 by a lens movement mechanism (not shown), and adjusts a focus.

The lens configurations of the first lens 21 to the sixth lens 26 are described in detail in "projection optical system and projection display device" such as Japanese Patent Application No. 2015-035085 (corresponding to US 2016/246037 A1) and Japanese Patent Application No. 2015-045989, and the optical systems described in these documents can be used as the first optical system 11 and the second optical system 12. According to the projection optical system and the projection display device, an optical system having high projection performance of which various aberrations are corrected in a wide angle is favorably obtained.

In the present embodiment, the first optical axis CL1 of the first lens 21 and the second lens 22 is reflected by the first mirror 13 and is bent at 90°, and thus, the second optical axis CL2 is formed. The second optical axis CL2 of the third lens 23 and the fourth lens 24 is reflected by the second mirror 14 and is bent at 90°, and thus, the third optical axis CL3 on an emission side is formed.

The first rotation mechanism 17 is disposed between an upper end portion of the third attachment barrel 34 and a lower plate 40d of the second main body 40. The first rotation mechanism 17 includes a first flange 45, a second flange 46, a circumferential groove 47, guide pins 48, and a first sensor 49. The first flange 45 is formed in a disc shape on an outer circumferential surface of the upper end portion of the third attachment barrel 34. The second flange 46 is formed in a disc shape on the lower plate 40d of the second main body 40.

Figure 3:
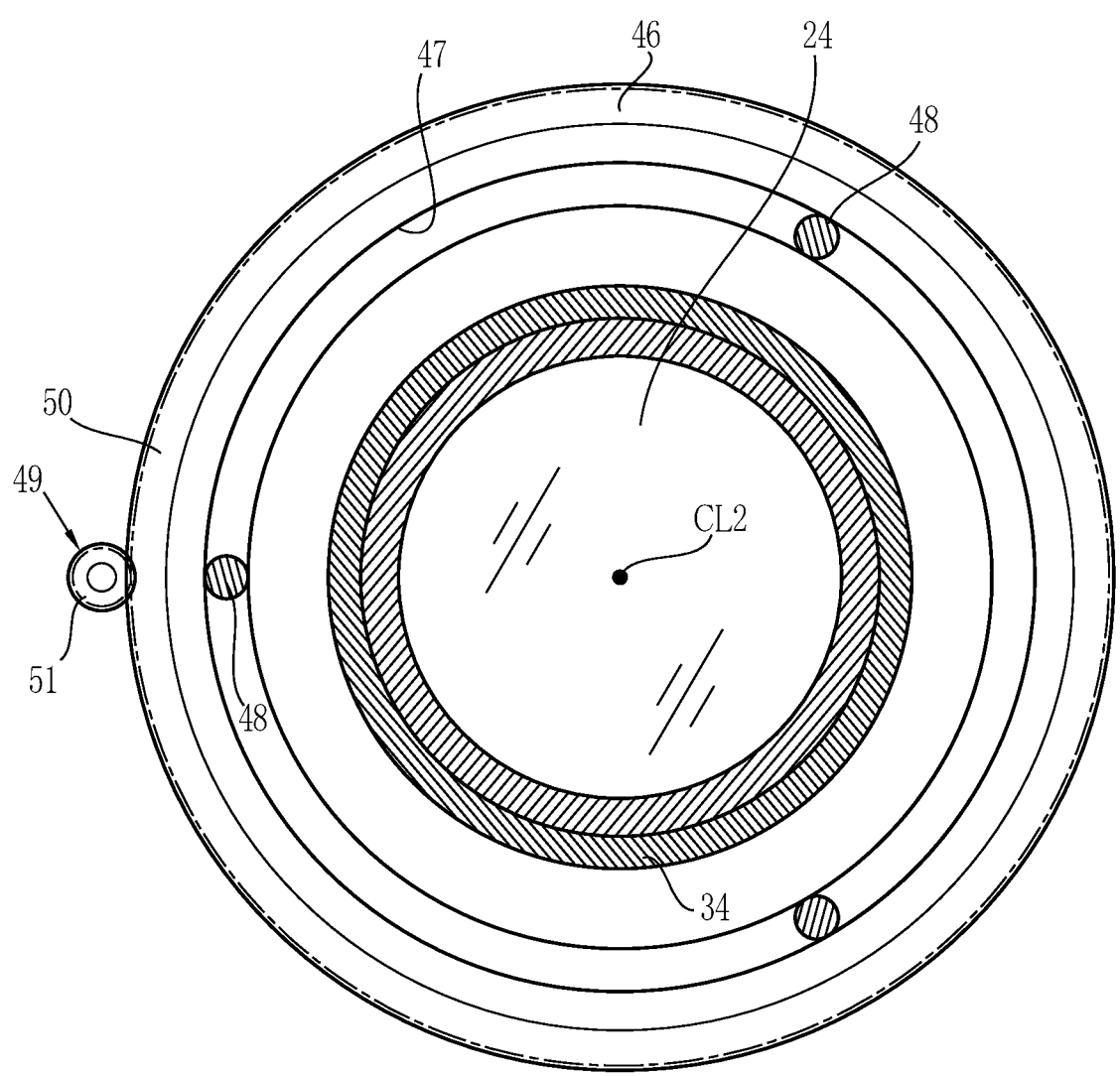
FIG. 3 is a cross-sectional view taken along line III-III in FIG. 2 showing a first rotation mechanism.

As shown in FIG. 3, the circumferential groove 47 is a groove having a circular groove with the second optical axis CL2 as a center, and is formed on a lower surface of the second flange 46. As shown in FIG. 2, the three guide pins 48 protrude on an upper surface of the first flange 45 in parallel with the second optical axis CL2. The three guide pins 48 are disposed at intervals of, for example, 120° in the circumferential direction. A front end of the guide pin 48 is inserted into the circumferential groove 47 in a state in which the first flange 45 and the second flange 46 are combined together. Accordingly, the guide pin 48 guided to the circumferential groove 47 is movable within a length range of the circumferential groove 47. Therefore, the rotational movement of the second optical system 12 including the second main body 40 is allowed with respect to the first optical system 11 including the third attachment barrel 34. Note that the first rotation mechanism 17 is rotatably held by a holding member (not shown) so that the first flange 45 and the second flange 46 do not separate from the combined surface.

As shown in FIG. 2, the first sensor 49, which is a rotary encoder, is attached to the first flange 45. The first sensor 49 has a first gear 51. The first gear 51 meshes with a second gear 50 formed on an outer peripheral surface of the second flange 46. The first sensor 49 generates a number of pulses corresponding to the rotation amount of the first gear 51. For example, a positive number of pulses is generated upon rotating in the clockwise direction, and a negative number of pulses is generated upon rotating in the counterclockwise direction. The signal from the first sensor 49 is sent to a controller 69 of the projector main body 60 via the mount unit 61 to be described later. Based on the positive or negative number of pulses, the controller 69 detects the rotational position of the second optical system 12 with reference to, for example, an upper rear projection position shown in FIG. 2.

Since the first sensor 49 is attached to the first flange 45 which is the fixed side when the second optical system 12 rotates, wiring to the first sensor 49 is easier than in a case that the first sensor 49 is attached to the second flange 46. Although not shown, the combined surface of the first flange 45 and the second flange 46 is provided with a friction mechanism. The friction mechanism generates a frictional force between the first flange 45 and the second flange 46 to regulate the rotation of the second optical system 12 at a rotation stop position.

The second rotation mechanism 18 is disposed between an end portion of the second attachment barrel 33 and the front plate 30c of the first main body 30. The second rotation mechanism 18 is constituted similarly to the first rotation mechanism 17, and includes a first flange 52, a second flange 53, a circumferential groove 54, guide pins 55, a second sensor 56, a first gear 57 and a second gear 58. These members 52 to 58 are configured in the same manner as the respective members 45 to 51 of the first rotation mechanism 17, and duplicate explanations are omitted.

As shown in FIG. 1, the projection lens 10 is attached to the projector main body 60 through the mount unit 61 so as to be attachable and detachable. The projector main body 60 includes an approximately rectangular parallelepiped casing 62. A light source 63, the image forming panel 64, a shift mechanism 65, and the controller 69 are accommodated within the casing 62. The projector main body 60 is formed in a rectangular parallelepiped shape having a square vertical cross section, and has a size in which corners of the projector main body 60 are located inside the movement range of the second optical system 12 whose center is the first optical axis CL1. Therefore, the rotation of the second optical system 12 will not make contact with the projector main body 60.

The center position of the image forming panel 64 coincides with the first optical axis CL. For example, a transmissive liquid crystal panel is used as the image forming panel 64. The light source 63 is disposed on a rear surface of the image forming panel 64, that is, a side opposite to the projection lens 10 with the image forming panel 64 as a reference. Light-emitting diodes (LEDs) that simultaneously emit three colors of red (R), green (G), and blue (B) are used as the light source 63, and illuminates the image forming panel 64. A xenon lamp, a halogen lamp, or an extra-high pressure mercury lamp which emits white light may be used instead of the LEDs. The projection lens 10 projects the illumination light from the image forming panel 64 illuminated by the light source 63 onto a projection surface, for example, the screen 28.

The shift mechanism 65 moves the mount unit 61, to which the projection lens 10 is coupled, in a horizontal direction and a vertical direction with respect to the casing 62, for example by a motor drive.

Figure 4:
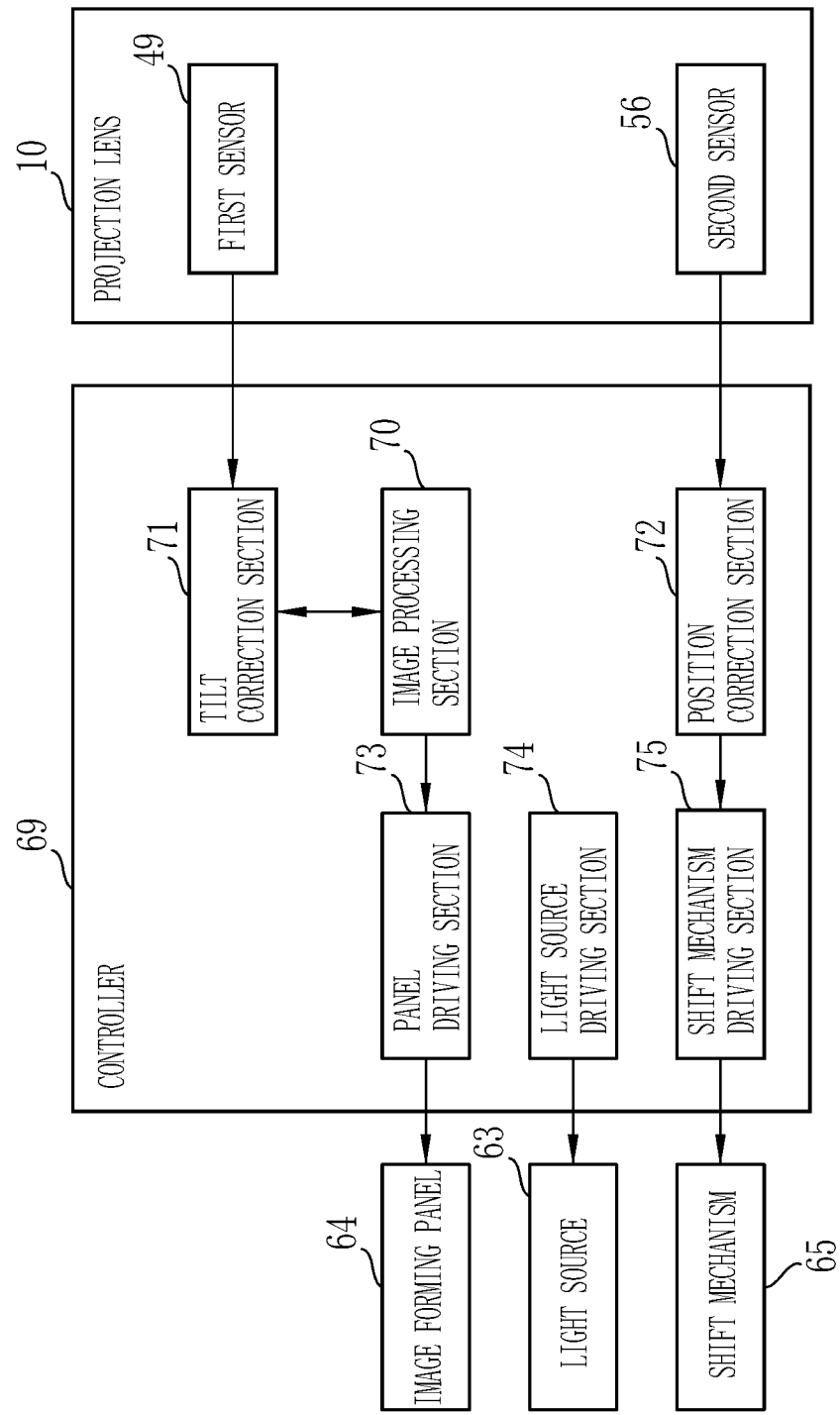
FIG. 4 is a control block diagram.

As shown in FIG. 4, the controller 69 includes an image processing section 70, a tilt correction section 71, a position correction section 72, a panel driving section 73, a light source driving section 74, and a shift mechanism driving section 75. The image processing section 70 processes a projection image from an image memory (not shown) and sends the image signal to the panel driving section 73. The panel driving section 73 drives the image forming panel 64 based on the image signal and displays images of three colors of RGB on an image forming surface 64a of the image forming panel 64 opposite to the surface facing the light source 63. The light source driving section 74 turns on the light source 63.

Figure 5:
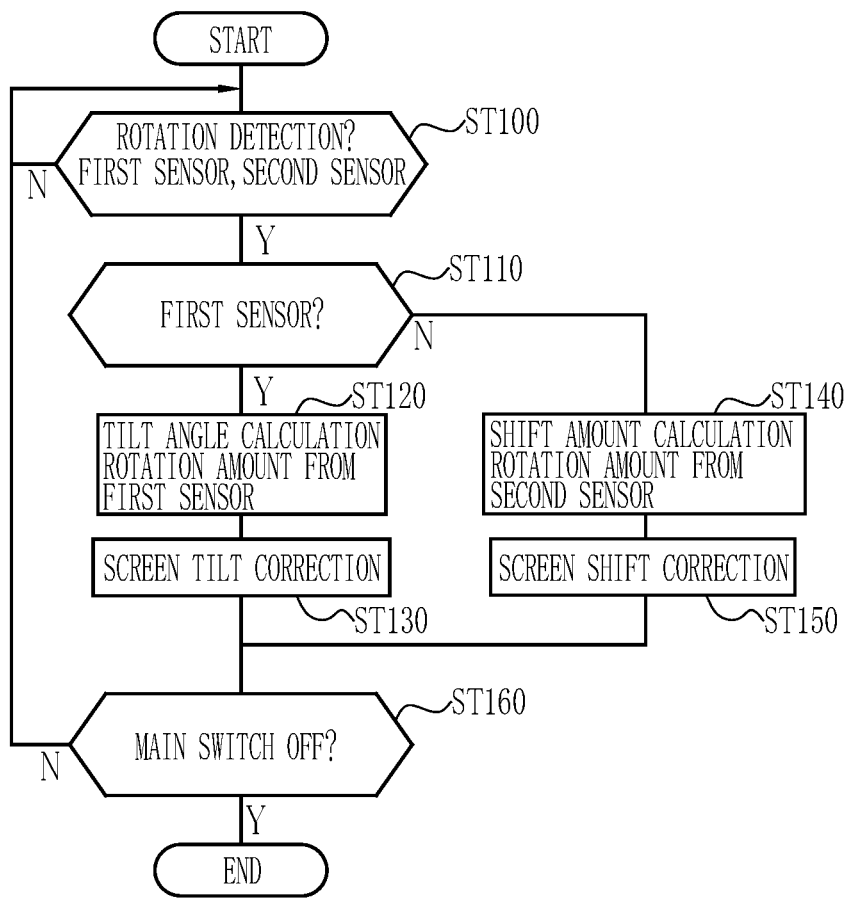
FIG. 5 is a flowchart showing procedures of screen tilt correction and screen position correction in a controller.

FIG. 5 is a flowchart showing procedures of screen tilt correction and screen position correction in the controller 69. The tilt correction section 71 calculates the tilt angle of the screen of the projection image based on the signal of the first sensor 49 (Y at both steps ST100 and 110, step ST120). For example, when the second optical system 12 is rotated by 5° from the upper rear projection position (see FIG. 2) based on the signal of the first sensor 49, the tilt angle of the screen by this 5° rotation is calculated. The tilt correction section 71 outputs the calculated tilt angle to the image processing section 70.

The image processing section 70 displays the image by tilting the display image so as to cancel the tilt of the screen according to the tilt angle from the tilt correction section 71 (step ST130). As a result, the tilt corrected image is projected on the screen 28.

For example, if the second optical system 12 is rotated 180° from the upper rear projection position around the second optical axis CL2, the image processing section 70 causes the image forming panel 64 to display an image (inverted image) in which the image is inverted upside down from the image obtained in the upper rear projection position.

The position correction section 72 calculates a shift of the display position of the image based on the signal of the second sensor 56 (Y in step ST100, N in step ST110, step ST140). The reference position is the screen center of the projection image in the upper rear projection position shown in FIG. 2. For example, when the second optical system 12 is rotated by an angle θ from the upper rear projection position based on the signal of the second sensor 56, the positional shift amount (x, y) with respect to the reference position corresponding to the tilt angle θ is obtained by the following equations:

$$x = L \times \sin \theta$$

$$y = L \times (1 - \cos \theta)$$

where x represents the lateral shift correction amount and y represents the vertical shift correction amount on the projection screen, and L represents the distance between the first optical axis L1 and the third optical axis L3 (see FIG. 2).

The position correction section 72 drives the motor of the shift mechanism 65 via the shift mechanism driving section 75 based on the obtained shift correction amount (x, y). As a result, the first optical axis CL1 of the projection lens 10 is shifted so as to cancel the shift correction amount (x, y) (step ST150). Thereafter, while the main switch is ON (N in step ST160), the above processes are repeated. Then, when the main switch is turned OFF (Y in step ST160), the above processes are terminated.

The controller 69 also performs the following processes. For example, in a case where the projection lens 10 has an electric zoom control function and an operation signal for a zoom dial 77 (see FIG. 1) is received, a size of the image projected onto the screen 28 is adjusted. In a case where an operation signal for a focus dial 78 (see FIG. 1) is received, the controller 69 adjusts a focus of the image projected onto the screen 28 by operating a focus adjustment mechanism (not shown) of the projection lens 10.

Next, the operation of this embodiment will be described. To change the projection direction, for example the second optical system 12 is held and rotated through the first rotation mechanism 17. In addition, the first optical system 11 is held and rotated through the second rotation mechanism 18. As shown in FIG. 5, according to these rotations, the first sensor 49 and the second sensor 56 detect each rotation amount. In accordance with each rotation amount, the screen tilt correction is performed by the image processing section 70 and the tilt correction section 71, and the screen position correction is performed by the position correction section 72 and the shift mechanism driving section 75.

FIGS. 6A to 6I show an example of changing the projection position using the first rotation mechanism 17 and the second rotation mechanism 18. FIG. 6A shows the upper rear projection position which is the reference position, also shown in FIG. 2. In this embodiment, the side on which the mount unit 61 is disposed is defined as the front side, and the side facing the front side is the rear side, of the projector main body 60. Also, the surface on which the dials 77, 78 are arranged is defined as the top side, the surface facing the top side is defined as the bottom side, the right side and the left side as viewed from the front side is defined as the right side and the left side.

Rotating the second optical system 12 clockwise 90° from the upper rear projection position in FIG. 6A through the first rotation mechanism 17 results in an upper right projection position in FIG. 6B. Further rotating the second optical system 12 clockwise 90° from the upper right projection position in FIG. 6B results in an upper front projection position in FIG. 6C.

Rotating the projection lens 10 clockwise 90° from the upper rear projection position in FIG. 6A through the second rotation mechanism 18 results in a middle rear projection position shown in FIG. 6D. Further rotating the projection lens 10 clockwise 90° from the middle rear projection position in FIG. 6D through the second rotation mechanism 18 results in a lower rear projection position in FIG. 6G.

Rotating the projection lens 10 clockwise 90° from the upper right projection position in FIG. 6B through the second rotation mechanism 18 results in a middle bottom projection position in FIG. 6E. Further rotating the projection lens 10 clockwise 90° from the middle bottom projection position in FIG. 6E through the second rotation mechanism 18 results in a lower left projection position in FIG. 6H.

Rotating the projection lens 10 clockwise 90° from the upper front projection position in FIG. 6C through the second rotation mechanism 18 results in a middle front projection position in FIG. 6F. Further rotating the projection lens 10 clockwise 90° from the middle front projection position in FIG. 6F through the second rotation mechanism 18 results in a lower front projection position in FIG. 6I. In this way, by appropriately changing the rotation amount of the first rotation mechanism 17 and the second rotation mechanism 18, it is possible to change the projection position to all directions of 360° without changing the install position of the projector 2. In addition, the projection position can be changed at three levels of the upper projection in FIGS. 6A to 6C, the middle projection in FIGS. 6D to 6F, and the lower projection in FIGS. 6G to 6I.

In the first embodiment, the first rotation mechanism 17 and the second rotation mechanism 18 allow projection in all directions of 360°. However, it may be provided with only the first rotation mechanism 17. In this case, the second optical system 12 can be rotated in the horizontal plane using only the first rotation mechanism 17, as shown in FIGS. 6A to 6B to 6C, FIGS. 6D to 6E to 6F, FIGS. 6G to 6H to 6I.

Since the first rotation mechanism 17 may have any structure as long as it can rotate the third attachment barrel 34 and the second main body 40 around the second optical axis CL2, various rotation guide mechanisms can be used for the first rotation mechanism 17. For example, a circumferential groove is formed on the outer circumferential surface of the third attachment barrel 34, and a guide pin that enters the circumferential groove is provided on the inner circumferential surface of an attachment hole of the second main body 40 to which the third attachment barrel 34 is attached. As the movement of the guide pin is regulated with the circumferential groove, the second optical system 12 can be rotated. Similarly, the second rotation mechanism 18 may use various kinds of rotation guide mechanisms.

In the above first embodiment, the shift mechanism 65 is operated by the position correction section 72 for the position correction. However, alternatively or in addition, the image processing section 70 may shift the center position of the image to be displayed on the image forming panel 64 for the position correction.

First Modification

Figure 7:
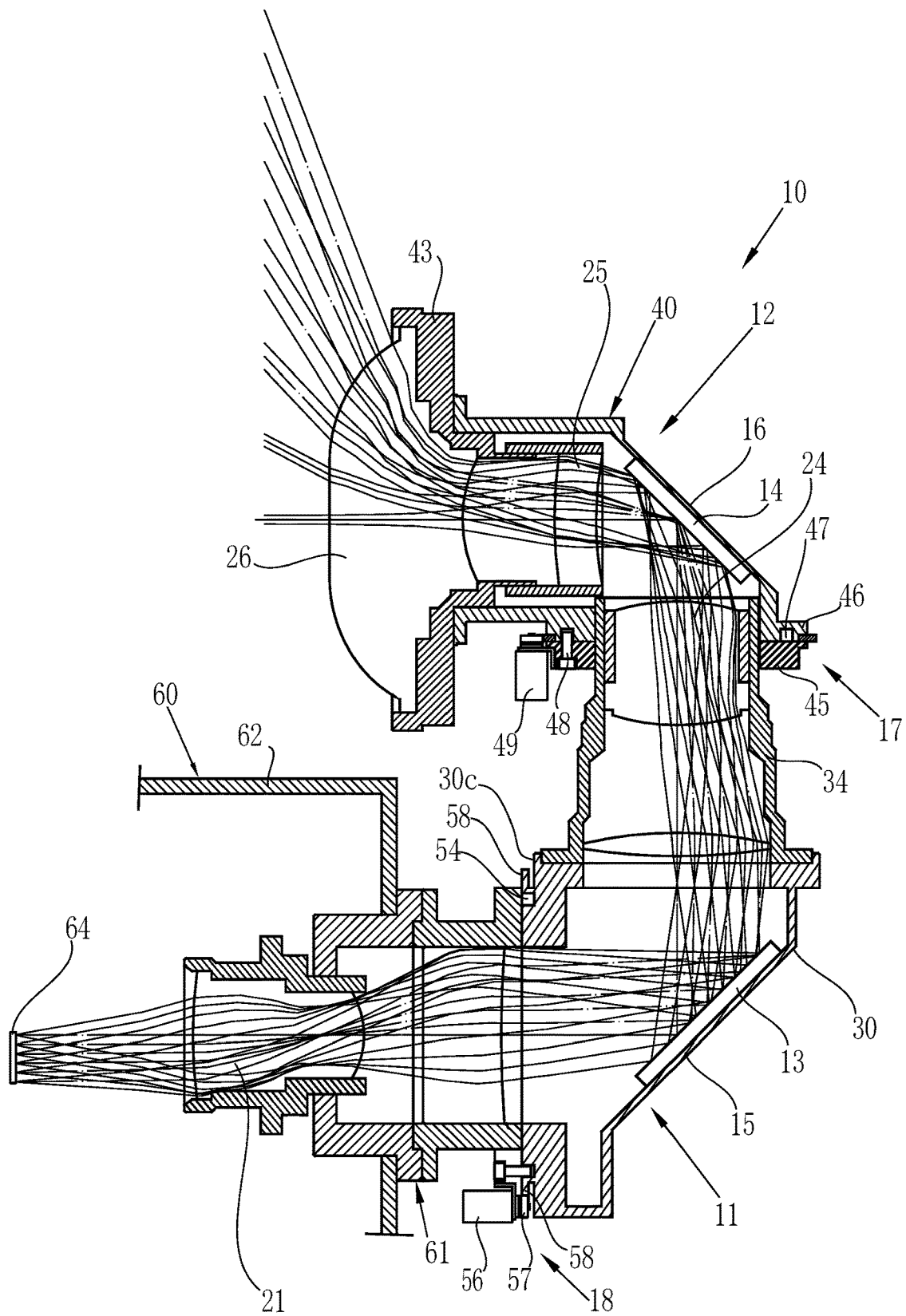
FIG. 7 is a long sectional view showing a rear-upward projection in a first modification in which an image forming panel is shifted relative to a first optical axis.
Figure 8:
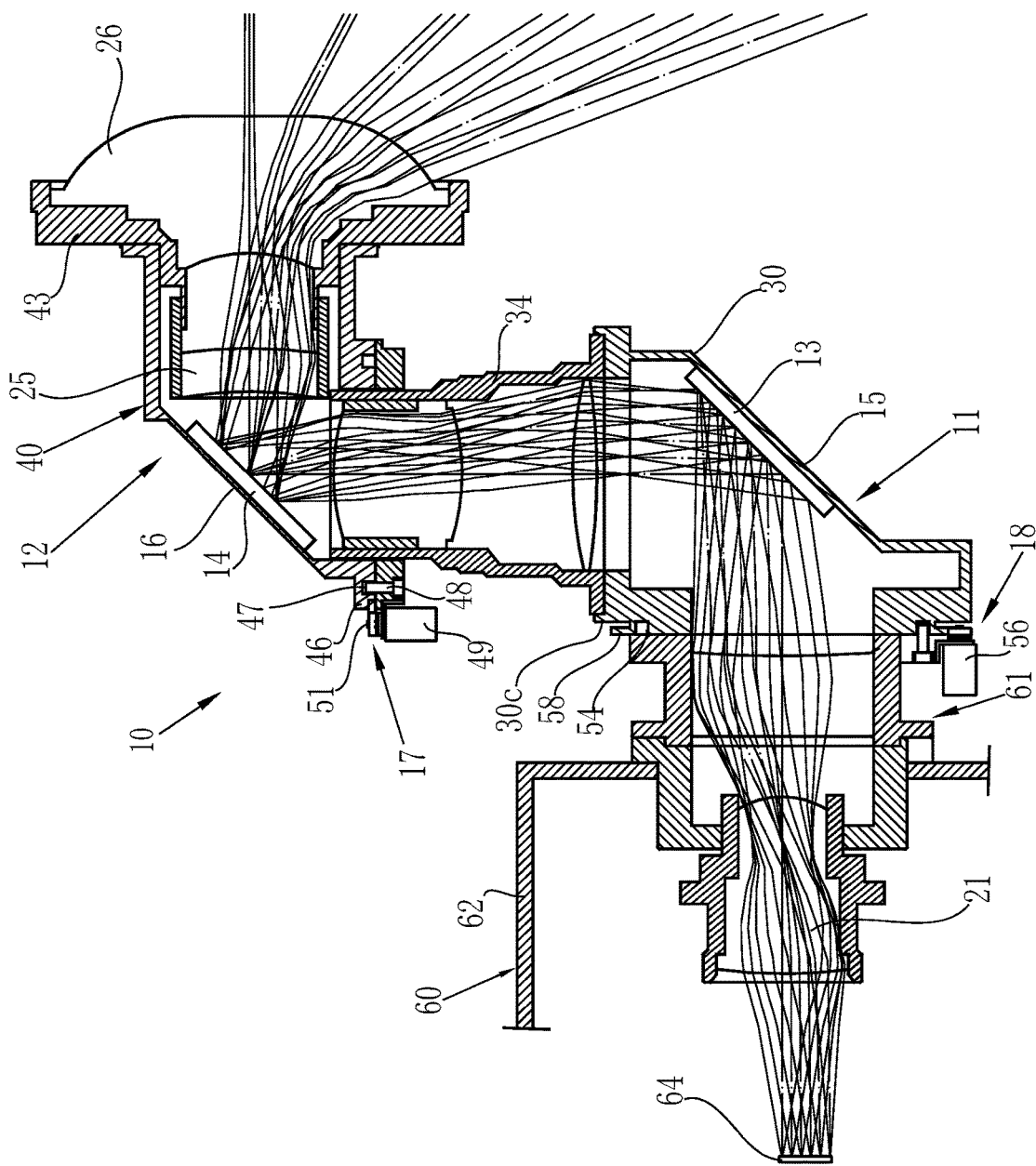
FIG. 8 is a long sectional view showing a front-upward projection in the first modification in which the image forming panel is shifted relative to the first optical axis.

In the first embodiment, the projection is performed with the first optical axis CL1 being aligned with the center position of the projection image of the image forming panel 64. However, as in a first modification shown in FIGS. 7 and 8, the image forming panel 64 may be arranged shifted, for example, downward relative to the first optical axis CL1. In this case, in the upper rear projection position of FIG. 6A, an image is displayed on the upper side of the screen as shown in FIG. 7. Also, in the upper front projection position of FIG. 6C, an image is displayed on the lower side of the screen as shown in FIG. 8. Therefore, projection in even more directions becomes possible.

Although the image forming panel 64 is shifted downward relative to the first optical axis CL1 in this modification, it may be shifted upward instead. Also, the object to be shifted in the direction orthogonal to the first optical axis CL1 may be the projection lens 10 instead of the image forming panel 64. Furthermore, both the image forming panel 64 and the projection lens 10 may be shifted.

Second Embodiment

Figure 9:
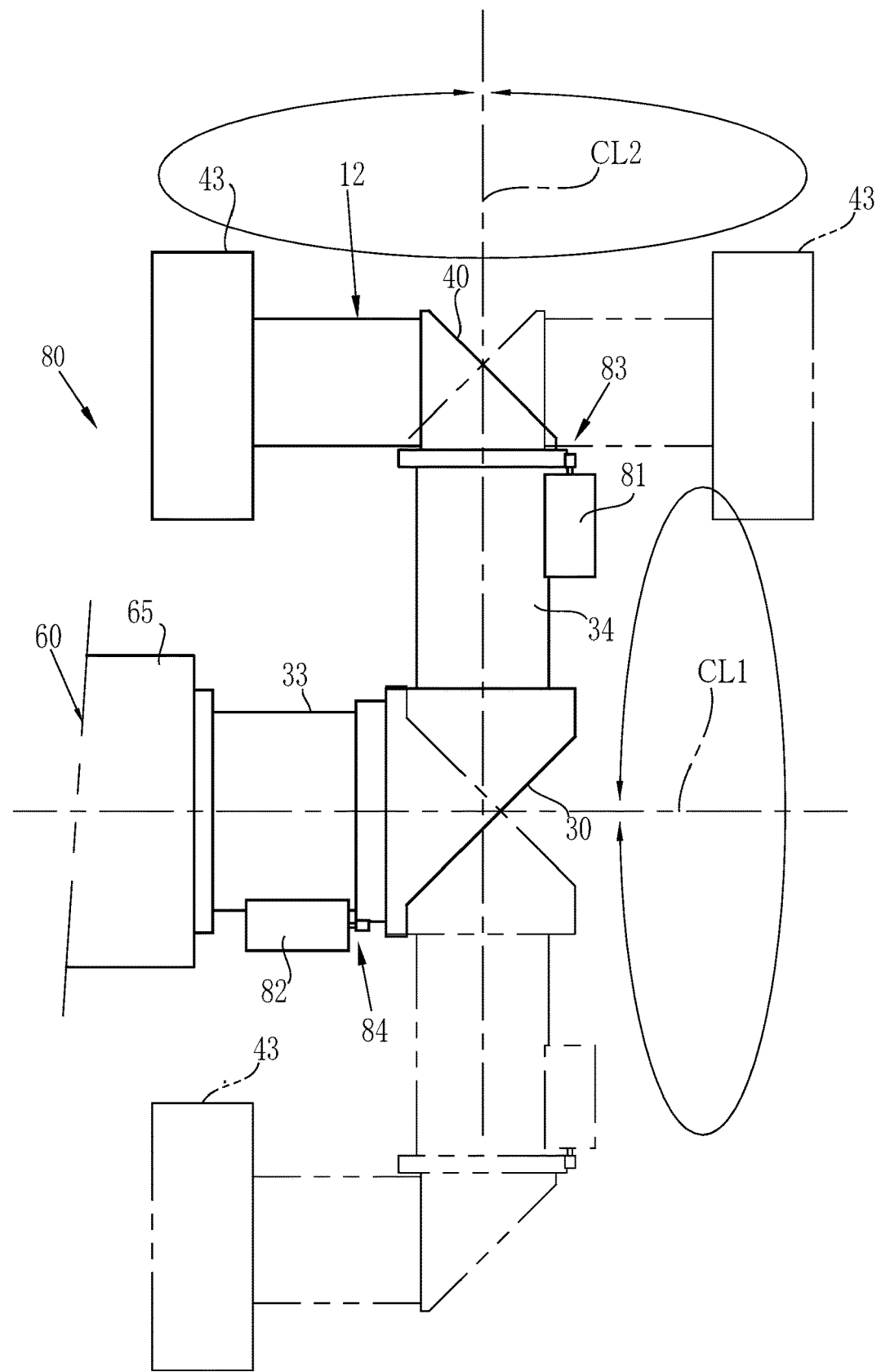
FIG. 9 is a side view of a second embodiment having a first rotation mechanism and a second rotation mechanism each of which is driven by a motor.
Figure 10:
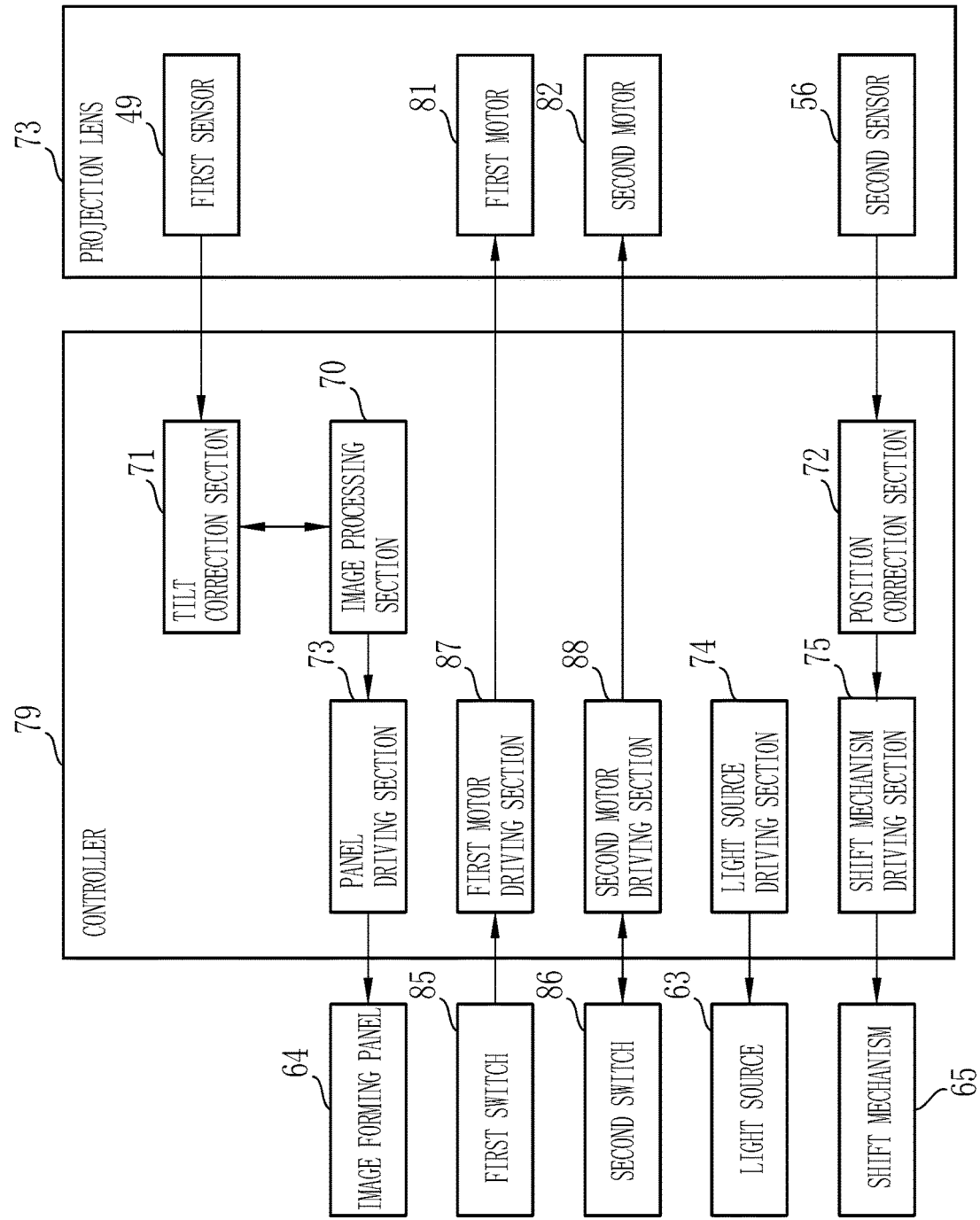
FIG. 10 is a control block diagram of the second embodiment.

In the first embodiment, the second optical system 12 and the projection lens 10 are manually rotated. Instead, in a projector 80 of a second embodiment shown in FIGS. 9 and 10, a first rotation mechanism 83 and a second rotation mechanism 84 are rotated by a first motor 81 and a second motor 82 via a controller 79. In this embodiment and following embodiments, the same components as those of the first embodiment will be assigned the same references, and the redundant description thereof will be omitted.

In the second embodiment, a first switch 85 and a second switch 86 are connected to the controller 79. By operating the first switch 85, the first motor 81 is rotated via a first motor driving section 87. Then the first rotation mechanism 83 is rotated accordingly and the orientation of the second optical system 12 is changed.

By operating the second switch 86, the second motor 82 is rotated via a second motor driving section 88. Then the second rotation mechanism 84 is rotated accordingly and the orientation of the first optical system 11 is changed.

Note that in the second embodiment, the first sensor 49 and the second sensor 56 of the first embodiment may be omitted. In this case, for example, drive pulses corresponding to the rotation amount of the motors 81 and 82 are counted to detect the rotation angle of the second optical system 12 and the projection lens 10. In this case, the motors 81 and 82 serve for the functions of the first and second sensors. Instead of or in addition to counting drive pulses of the motors 81 and 82, the rotation angle of the gear may be detected by a rotation detecting plate and a sensor (not shown). In this case, for example, the rotation detecting plate, provided with a large number of notches at a constant pitch, is fixed on the outer peripheral surface of the gear, and the passage of the large number of notches is detected by a photo interrupter to obtain the rotation angle.

Third Embodiment

Figure 11:
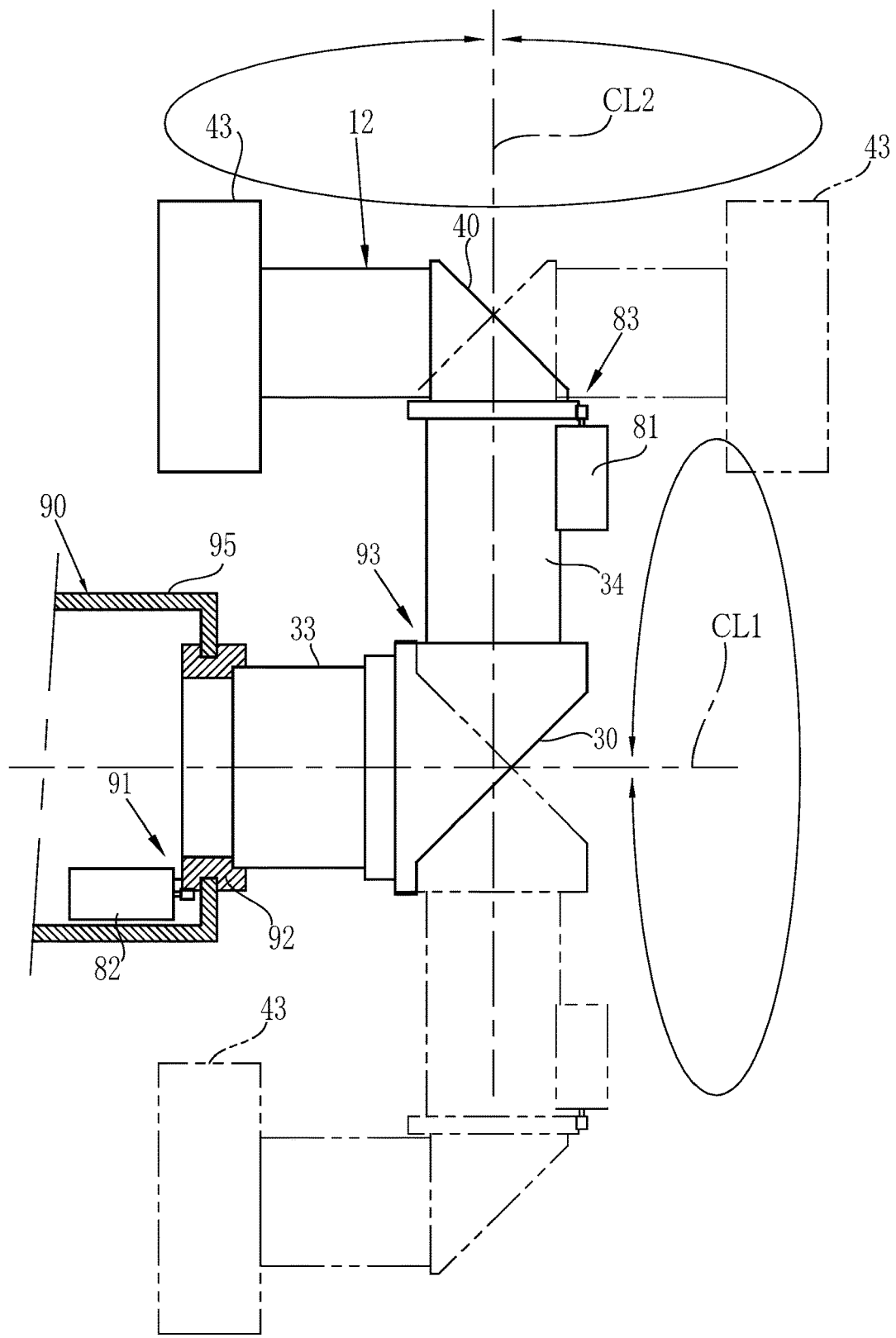
FIG. 11 is a side view of a third embodiment having the second rotation mechanism on the projector main body side.

In each of the above embodiments, the second rotation mechanism 18 or 84 is provided in the projection lens 10. However, as in a third embodiment shown in FIG. 11, a mount rotation mechanism 91 and a mount unit 92 may be provided in a casing 95 of a projector main body 90. In this case, the second sensor is also provided in the casing 95 (not shown). Since the mount rotation mechanism 91 has basically the same configuration as the second rotation mechanism 84, the same components as those of the second rotation mechanism are assigned the same references. In the third embodiment, by rotating the mount unit 92 with the second motor 82, it is possible to rotate a first optical system 93 around the first optical axis CL1.

Fourth Embodiment

Figure 12:
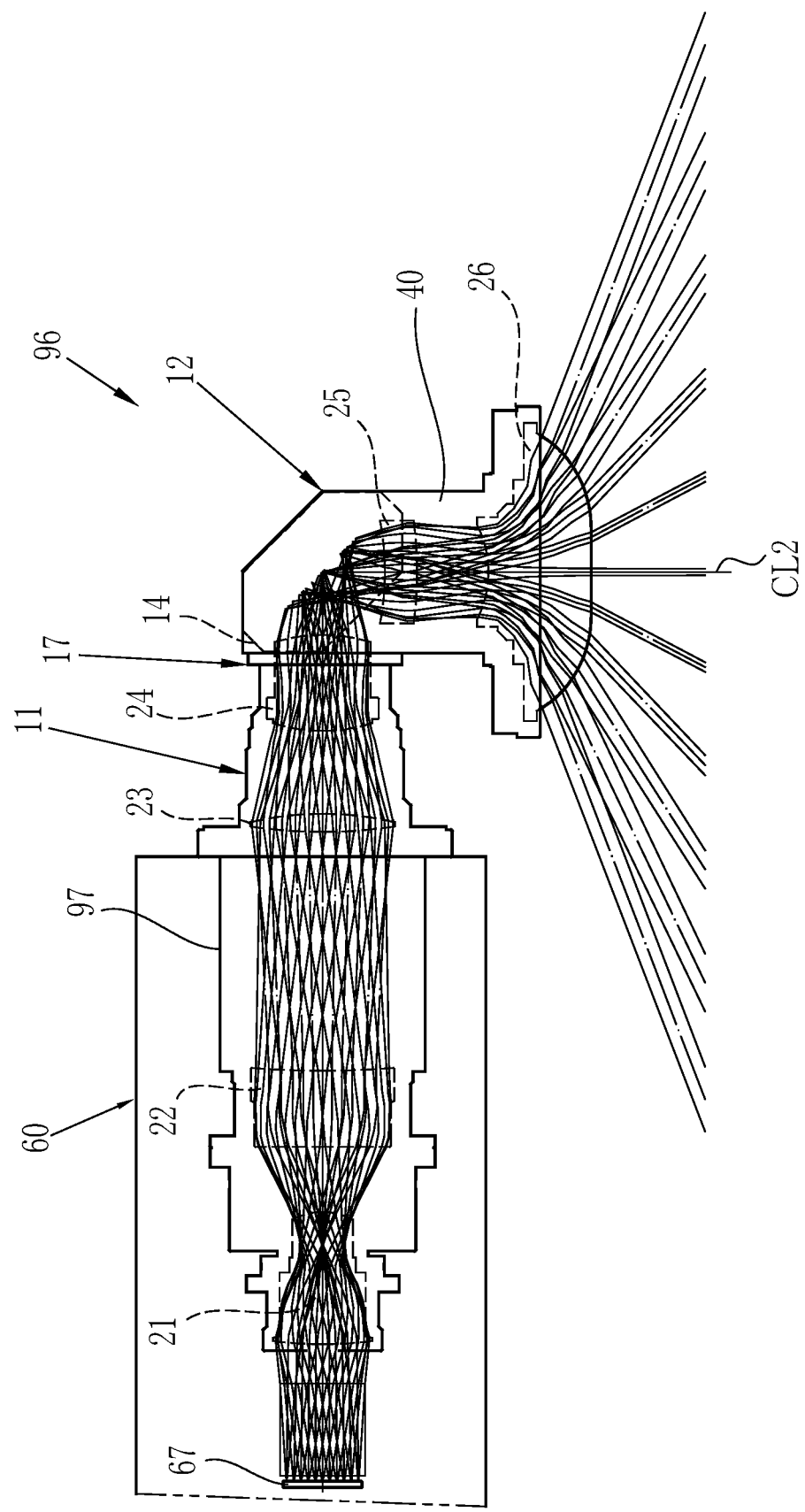
FIG. 12 is a plan view showing a projector of a fourth embodiment using one mirror.
Figure 13:
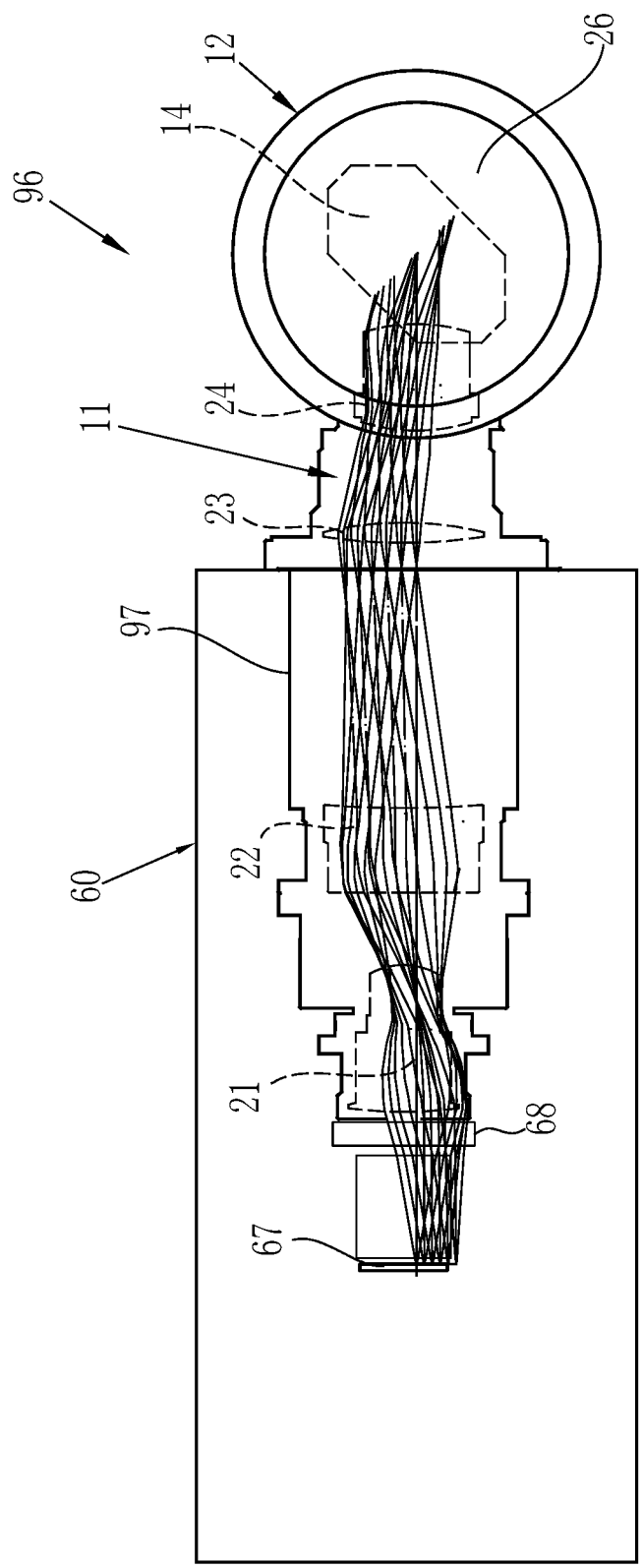
FIG. 13 is a side view of the projector of the fourth embodiment.
Figure 14:
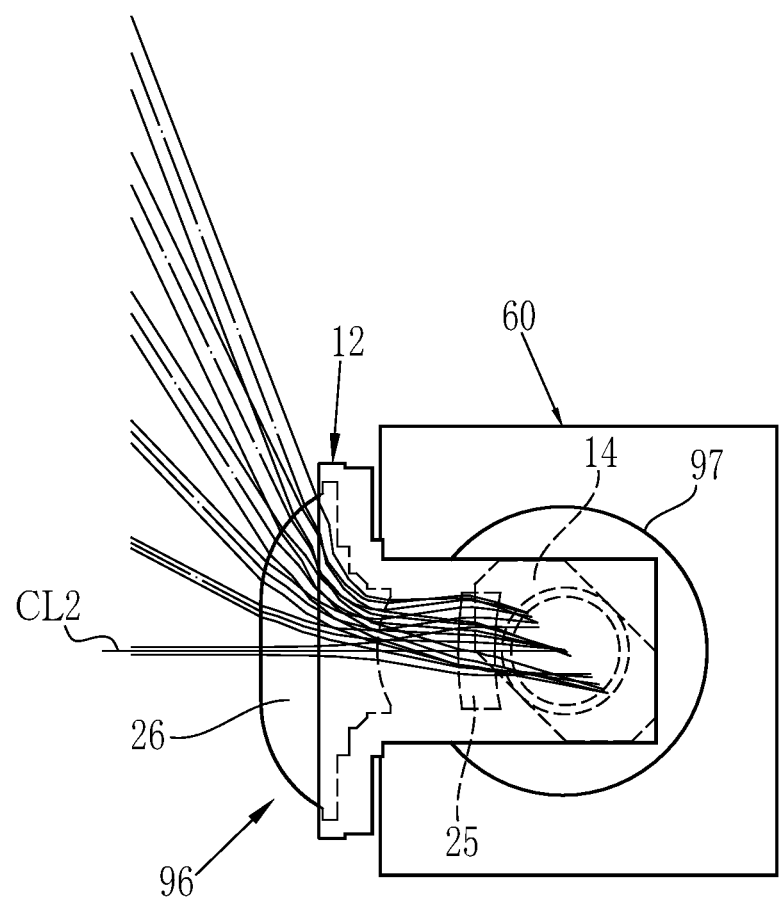
FIG. 14 is a front view of the projector of the fourth embodiment.

Two mirrors 13 and 14 are used in the first embodiment. In a fourth embodiment shown in FIGS. 12 to 14, the first mirror 13 is removed, only the second mirror 14 is used, and a projection lens 96 whose optical axis has an L shape is used. Accordingly, a cylindrical first main body 97 is provided instead of the first main body 30 of the first embodiment which is the approximately rectangular parallelepiped square tube. The first main body 97 is accommodated in the projector main body 60. The second mirror 14 forms the second optical axis CL2 by bending the first optical CL1 (not shown) of the first lens 21 and the second lens 22. The fourth embodiment has the same configuration as the first embodiment except that the first mirror 13 of the first embodiment is removed and the first main body 97 has the cylindrical shape. In this embodiment, the same components as those of the first embodiment will be assigned the same references. Note that three or more mirrors may be used. In this case, the mirror that separates the first optical system 11 and the second optical system 12 is the mirror provided on the most exit side closest to the projection surface on the optical axis. The mirror on the most exit side in the first to third embodiments is the second mirror 14.

Although the transmissive liquid crystal panel is used as the image forming panel 64 in the embodiments, a reflective liquid crystal panel may be used. In this case, the light source 63 is disposed on the front side of the image forming panel 64, and the irradiation light rays of three RGB colors are simultaneously irradiated. In a case where a DMD (Digital Micromirror Device) is used as the image forming panel 64, the light source 63 is disposed on the front side of the image forming panel 64, and LEDs of three RGB colors are emitted in time division in synchronization with a forming timing of a three-color image of the DMD.

Although it has been described in a state in which the projector 2 is disposed on the table in the embodiments, the present invention is also applicable to a case where the projector 2 hung from a ceiling is used. Although it has been described that the image is projected onto the screen 28, the projection surface is not limited to the screen 28. A projector that projects the image onto various projection surfaces can be used.

It has been described in the embodiments that the terms of perpendicular and parallel are used for expressing the positional relationship between the plurality of optical axes or the specific numerical angle such as 90° is used. However, these terms and numerical angle include a range allowable within an error corresponding to accuracy required in the optical system.

Although the projector 2 including the exchangeable projection lens 10 through the mount unit 61 is described in the first embodiment, the projection lens 10 is also applicable to a projector fixed to the projector main body 60. For example, in a case where the exchangeable projection lens 10 is used, some lenses of the first optical system 11, for example, the first lens 21 and the second lens 22 may be provided in the projector main body, and the number of lenses on the projection lens 10's side may be reduced.

What is claimed is:
1. A projector comprising:
a casing;
an image forming panel in the casing;
a shift mechanism; and
a projection lens projecting an image on the image forming panel onto a projection surface, and being attached to the casing of the projector, the projection lens comprising:
a first mirror to bend a first optical axis to a second optical axis;

a second mirror to bend the second optical axis to a third optical axis;

a first optical system including the first mirror and disposed on the image forming panel side with respect to the second mirror in an optical path;

a second optical system including the second mirror and disposed on the projection surface side with respect to the first optical system in the optical path;

a first rotation mechanism holding the second optical system rotatably around the second optical axis with respect to the first optical system;

a second rotation mechanism holding the first optical system rotatably with respect to the casing;

a sensor detecting a rotation of the first optical system by the second rotation mechanism, and a barrel through which light of the second optical axis passes, wherein the second rotation mechanism is rotatable on a plane formed by a first direction, which is a horizontal direction, and a second direction, which is a vertical direction, wherein the projection lens is capable of projecting an image onto a projection surface on the first direction side and a projection surface on a third direction side crossing the first direction and the second direction, wherein the projection lens is capable of projecting an image onto a projection surface on the second direction side by the rotation of the second rotation mechanism that causes the barrel to follow the horizontal direction and the rotation of the first rotation mechanism, and wherein the shift mechanism is disposed in the casing and shifts the projection lens including the second rotation mechanism in the first direction or the second direction based on the detection of the sensor.

2. The projector according to claim 1,
wherein the projection lens is movable between a first position in which the barrel extends to one side of the second direction and a second position in which the barrel extends to the other side of the second direction, upon rotation of the second rotation mechanism.

3. The projector according to claim 2,
wherein the projection lens is movable between the first position and the second position without contacting the casing, upon rotation of the second rotation mechanism.

4. The projector according to claim 3,
wherein a tip of the projection lens is located inside the casing from an end of the casing in a side view, in case that the projection lens is in the first position or in the second position.

5. The projector according to claim 1,
wherein the barrel has a first lens and a second lens closer to the first mirror than the first lens, and a diameter of the second lens is larger than a diameter of the first lens.

6. The projector according to claim 2,
wherein the barrel has a first lens and a second lens closer to the first mirror than the first lens, and a diameter of the second lens is larger than a diameter of the first lens.

7. The projector according to claim 1, further comprising:
a tilt correction section for correcting a tilt of an image due to the rotation of the first rotation mechanism.

8. The projector according to claim 2, further comprising:
a tilt correction section for correcting a tilt of an image due to the rotation of the first rotation mechanism.

9. The projector according to claim 3, further comprising:
a tilt correction section for correcting a tilt of an image due to the rotation of the first rotation mechanism.

10. The projector according to claim 4, further comprising:
a tilt correction section for correcting a tilt of an image due to the rotation of the first rotation mechanism.

11. The projector according to claim 1, further comprising:
a tilt correction section for correcting a tilt of an image due to the rotation of the first rotation mechanism.

12. The projector according to claim 1, further comprising:
a first sensor for detecting a rotation angle of the second optical system with respect to the first optical system by the first rotation mechanism.

13. The projector according to claim 1, further comprising:
an operation switch provided in the casing for rotating the first rotation mechanism or the second rotation mechanism.

14. The projector according to claim 1, wherein the shift mechanism shifts the projection lens including the second rotation mechanism in the first direction and the second direction.

15. The projector according to claim 1, wherein the second optical system includes an emission lens emitting the image, and a diameter of the emission lens is the largest among lenses of the first optical system and the second optical system.

16. The projector according to claim 1, wherein the projection lens forms an intermediate image from light of the image forming panel, and projects the intermediate image onto the projection surface.

17. The projector according to claim 16, wherein the second optical system includes an emission lens emitting the intermediate image, and a diameter of the emission lens is the largest among lenses of the first optical system and the second optical system.

* * * * *